June 26, 1962 B. D. PARKER 3,041,476

REGISTERS FOR BINARY DIGITAL INFORMATION

Filed April 22, 1959 4 Sheets-Sheet 1

INVENTOR
BERNHARD DOLLMAN PARKER
BY Mawhinney & Mawhinney
ATTYS.

INVENTOR
BERNARD DOLLMAN PARKER
BY: Mawhinney & Mawhinney
ATTYS.

June 26, 1962 B. D. PARKER 3,041,476

REGISTERS FOR BINARY DIGITAL INFORMATION

Filed April 22, 1959 4 Sheets-Sheet 3

INVENTOR
BERNHARD DOLLMAN PARKER
BY Mawhinney & Mawhinney
ATTYS.

June 26, 1962 B. D. PARKER 3,041,476

REGISTERS FOR BINARY DIGITAL INFORMATION

Filed April 22, 1959 4 Sheets-Sheet 4

INVENTOR
BERNARD DOLLMAN PARKER
BY: Mawhinney & Mawhinney
ATTYS.

3,041,476

REGISTERS FOR BINARY DIGITAL INFORMATION

Bernhard Dollman Parker, London, England, assignor to The Decca Record Company Limited, London, England, a British company Filed Apr. 22, 1959, Ser. No. 808,257
Claims priority, application Great Britain Apr. 23, 1958
4 Claims. (Cl. 307—88.5)

This invention relates to registers for binary digital information. The register of the present invention is particularly suitable for, although not limited to, forming part of a logical control unit for a computer or other device handling binary digital information.

According to this invention, a control register comprises a number of bi-stable devices arranged in a sequential order, each bi-stable device being capable of being set in one or other of two states referred to hereinafter as "on" and "off," a gate associated with each bi-stable device, and first and second gate controlling circuits controlling respectively the gates associated with alternate bi-stable devices in the sequential order, the first gate-controlling circuit being associated with the first, third etc. bi-stable devices and the second gate-controlling circuit being associated with the second, fourth, etc. bi-stable devices, the gate-controlling circuits being arranged periodically each to open its associated gates for short periods with the two gate-controlling circuits being operated alternately and each gate, when open, being arranged, if the associated bi-stable device is in an "on" condition, to set the next bi-stable device to that condition and to re-set the preceding bi-stable device to the "off" condition. Thus if it is assumed that the $n$th bi-stable device is in the "on" condition, operation of the appropriate one of the gate-controlling circuits opens the gate associated with this bi-stable device for a short period and the $(n+1)$th bi-stable device is switched to the "on" condition whilst the $(n-1)$th device is switched to the "off" condition. The $n$th bi-stable device remains in the "on" condition. When the other gate-controlling circuit is operated, the gate associated with the $(n+1)$th bi-stable device will be open for a short period so switching the $(n+2)$th bi-stable device to the "on" condition and switching the $n$th bi-stable device to the "off" condition. It will thus be seen that the digital information represented by the condition of a bi-stable device is gradually moved along the register but it will be noted that the switching operation for effecting such movement merely opens a gate and sets the next bi-stable device without removing the information from the device in which it is already stored. This information is not removed until the next step in the operation.

It will be understood that, considering a complete assembly, when reference is made to the next and to the preceding bi-stable devices, at the two ends there may be special conditions depending on required input and output arrangements.

A specific register, and modifications thereof, embodying the invention will now be described by way of example, and with reference to the accompanying drawings in which.

Figure 1:
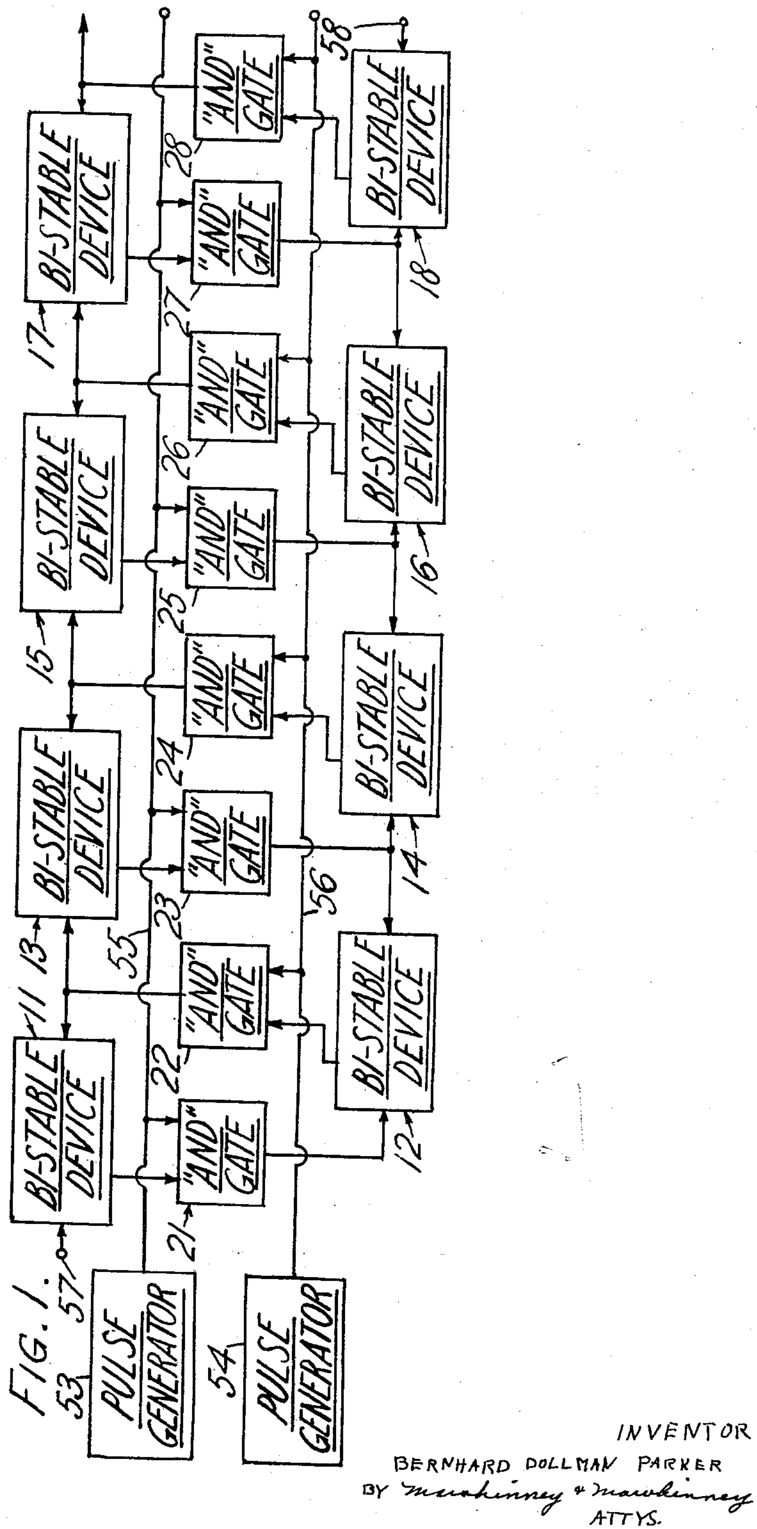
FIGURE 1 is a block diagram of the register.
Figure 2:
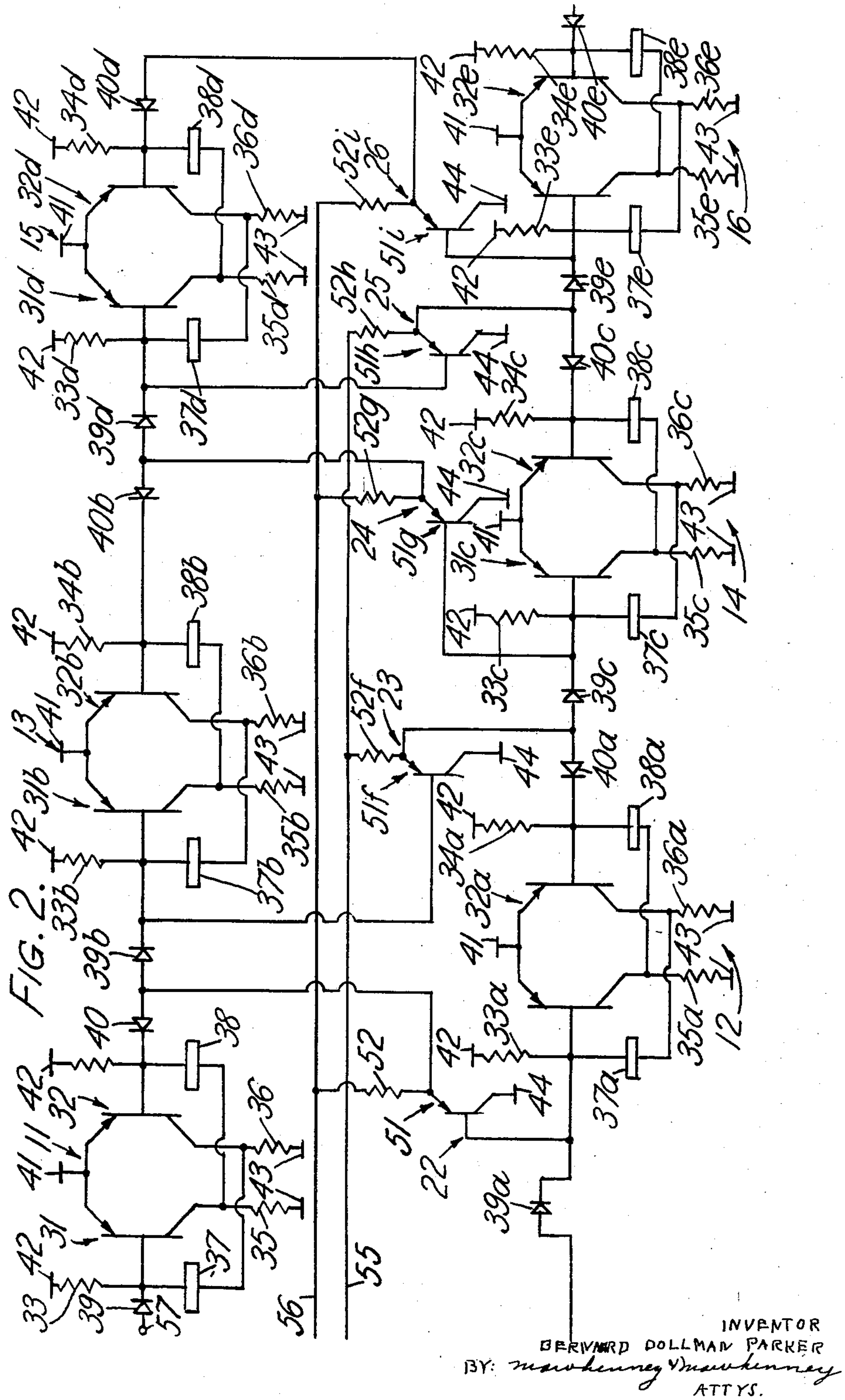
FIGURE 2 is a circuit diagram of part of the register.

In this example the register comprises bi-stable devices 11, 12 . . . 18 and gates 21, 22 . . . 28 associated with them respectively. The bi-stable devices are all identical and each of them comprises two transistors 31, 32, resistors 33 . . . 36, low voltage stabilisers 37, 38 interconnected respectively between the collector electrode of one of the two transistors and the base electrode of the other, and diodes 39, 40. The reference numerals of the components of the bi-stable devices 11 . . . 16 have the suffixes *a* . . . *e* respectively added to them. The transistors are all connected to supply-conductors 41, 42, 43, 44 at appropriate supply potentials.

When a pulse is applied through the diode 39 to the base of the transistor 31 it causes that transistor to become non-conducting and the transistor 32 to become conducting. The bi-stable device is then said to be in the "on" condition. When a pulse is applied through the diode 40 to the base of the transistor 32 it causes that transistor to become non-conducting and the transistor 31 to become conducting. The bi-stable device is then said to be in the "off" condition.

The gates 21 . . . 28 are "and" gates. They are all identical and each comprises a transistor 51 and a resistor 52. The reference numerals of the components of the gates 22 . . . 26 have the suffixes *f* . . . *i* respectively added to them.

The gates 21, 23, 25 and 27 are connected by a conductor 55 to a pulse generator 53 which produces a succession of pulses at regular intervals. The gates 22, 24, 26 and 28 are connected by a conductor 56 to a second pulse generator 54 which produces a succession of pulses which occur at regular intervals between the pulses of the generator 53; i.e. the generators 53 and 54 produce pulses alternately. The gates 21, 23, 25 and 27 are open for the duration for each of the pulses from the pulse generator 53, and the gates 22, 24, 26 and 28 are open for the duration of each of the pulses from the pulse generator 54.

If all the bi-stable devices are initially "off" and a pulse is applied to the input terminal 57, it changes the bi-stable device 11 to its "on" condition. The next time a pulse is provided by a pulse generator 53, the gate 21 opens for a short time and sends a pulse to the bi-stable device 12, thereby changing it to its "on" condition. The next pulse from the pulse generator 54 opens the gate 22 for a short time and a pulse is thus sent from the gate 22 to the bi-stable devices 11 and 13. The device 13 is thereby changed to its "on" condition and the device 11 is changed back to its "off" condition. The next pulse from the pulse generator 53 causes the gate 23 to open and to apply a pulse to the bi-stable devices 12 and 14, thereby changing the device 12 back to its "off" condition and changing the device 14 to its "on" condition. The bi-stable devices 11 . . . 18 are thus turned "on" and then "off" in sequence at a rate dependent by the pulse repetition rate of the pulse generators 53, 54, until the bi-stable device 18 is changed to its "on" condition. The device 18 can be changed back to its "off" condition by applying a pulse to the terminal 58.

Each of the bi-stable devices represents a binary digit "1" or "0" dependent upon whether it is in its "on" or "off" condition. It will be appreciated that if, when the register is first switched on, any of the bi-stable devices 11 . . . 17 may be in their "on" condition, and therefore initially all but one have to be set to the "off" condition. At any time a maximum of two bi-stables can be in their "on" condition.

The register described above can be used as a simple store in which the information is shifted along the store but information can be extracted at any point along the register without affecting the shifting of the information through the register. If desired a conditional stop circuit may be provided to stop the information being transferred along the register. For this purpose the conditional stop circuit may comprise means arranged to apply a signal to a selected appropriate gate so as to prevent that gate from passing a signal to operate the next bi-stable device.

Figure 3:
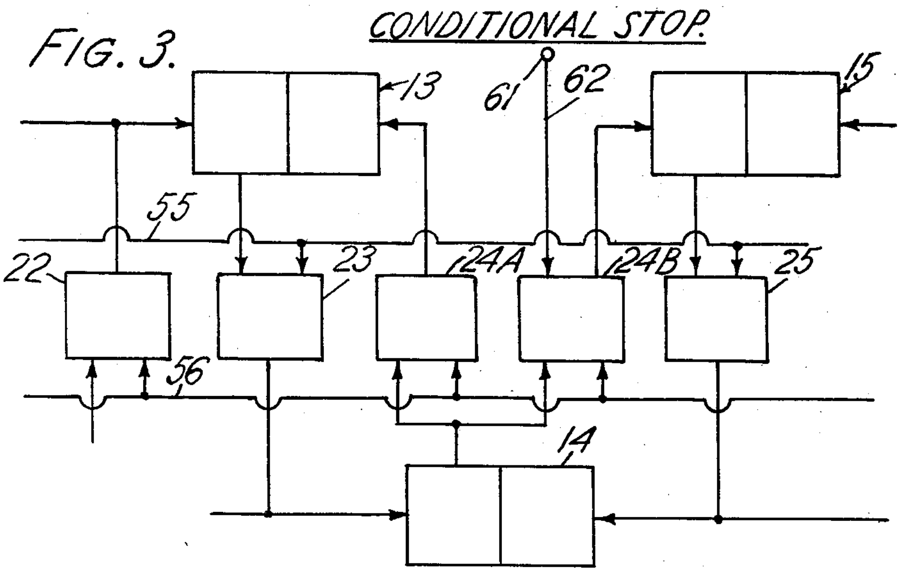
FIGURE 3 shows a modification.

FIGURE 3 shows the diagram of FIGURE 1 modified to embody such an arrangement. In this FIGURE the gate 24 of FIGURE 1 is replaced by two gates 24A and 24B. Both these gates are opened by pulses on the conductor 56. The gate 24A serves to switch the bi-stable device 13 to the "off" condition whilst the gate 24B serves to switch the bi-stable device 15 to the "on" condition. When a signal is supplied to the gate 24B from a terminal 61, which is connected to the gate 24B by a conductor 62, the gate 24 is prevented from opening, and no pulses can in that case be sent from the gate 24 to the *bi-stable device* 16 *is "on," a pulse is thereby supplied to* device 14 is "on" or "off." The signal at terminal 61 thus stops the information being transferred along the store.

It is also possible to provide a conditional transfer circuit by providing two or more gates associated with one bi-stable device and selector means for selecting the appropriate gate. Whatever gate is selected will pass a signal to switch off the preceding bi-stable device but according to the choice of gate, a selected next succeeding bi-stable device will be switched on. Such a conditional transfer circuit may, for example, be arranged to select whether information is passed onwards to a succeeding bi-stable device or is fed back over a feed-back loop to one of the preceding bi-stable devices.

Figure 4:
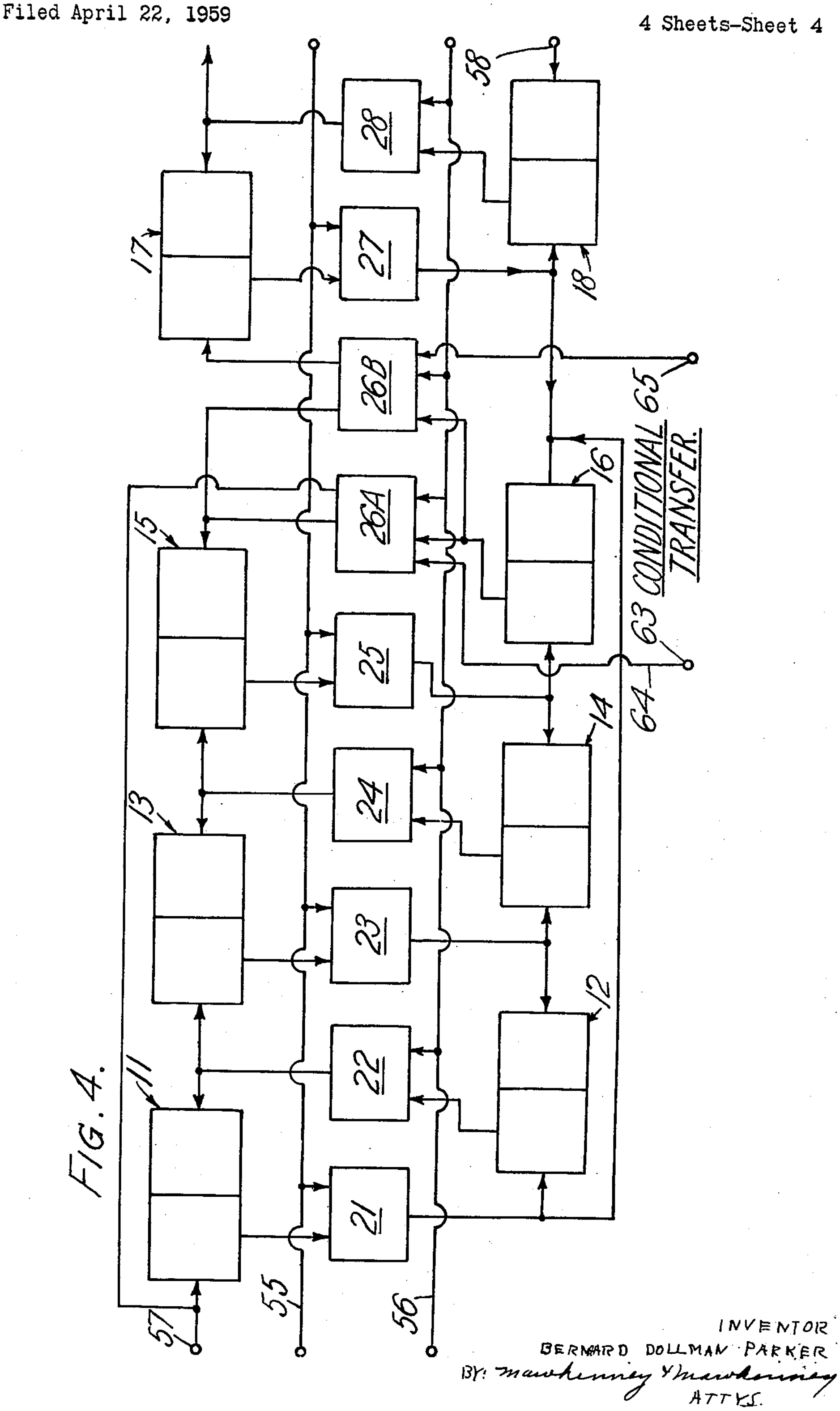
FIGURE 4 shows another modification.

Such a conditional transfer arrangement is shown in FIGURE 4, which is a modification of FIGURE 1. The gate 26 is replaced by two gates 26A and 26B. The gate 26A can be prevented from opening by applying a signal to the terminal 63 which is connected to the gate 26A by a conductor 64 and the gate 26B can be prevented from opening by applying a signal to the terminal 65 which is connected to the gate 26B by a conductor 66. In this arrangement a signal is always applied either to the terminal 63 or terminal 65, so that a selected one of the gates 26A, 26B opens when a pulse is supplied by the pulse generator 54. When a gate 26B opens, while the bi-stable device 16 is "on," a pulse is thereby supplied to the bi-stable device 17 to change it to its "on" condition and a pulse is also supplied to the bi-stable device 15 to change it to its "off" condtion, and in that case the sequence of operation of the bi-stable devices is as in FIGURE 1, viz. 11, 12, 13, 14, 15, 16, 17, 18. When the gate 26A opens, while the bi-stable device 16 is "on," a pulse is thereby supplied to the bi-stable device 11 to change it to its "on" condition, and a pulse is also supplied to the bi-stable device 15 to change it to its "off" condition. The sequence of operation of the bi-stable devices in that case is as follows, 11, 12, 13, 14, 15, 16, 11, 12, 13 etc. Thus, when the gate 26B is permitted to open the information is passed onwards from the bi-stable device 16 to the succeeding bi-stable device 17, but when the gate 26A is permitted to open information is fed back over a feed-back loop 66 to the bi-stable device 11.

In these examples the transistor bi-stable devices are as described in co-pending United States patent application No. 752,259, filed July 31, 1958.

If the output from any point in the register is required as a short duration output pulse it may be taken from the output of the appropriate gate. If a static output is required that is to say not a short duration pulse, conveniently the output is taken directly from the appropriate bi-stable device.

The invention is not restricted to the details of the foregoing examples.

I claim:

1. A control register comprising a number of bi-stable devices arranged in sequential order, each bi-stable device being capable of being set in one or other of two states referred to hereinafter as "on" and "off," a gate associated with each bi-stable device, and first and second gate-controlling circuits controlling respectively the gates associated with alternate bi-stable devices in the sequential order, the first gate-controlling circuit being associated with the first, third, etc. bi-stable devices and the second gate-controlling circuit being associated with the second, fourth etc. bi-stable devices, the gate-controlling circuits being arranged periodically each to open its associated gates for short periods with the two gate-controlling circuits being operated alternately, each gate associated with the odd-numbered bi-stable devices, when open, being arranged, if the associated bi-stable device is in an "on" condition, to set the next odd-numbered bi-stable device to that condition and to reset the preceding odd-numbered bi-stable device to the "off" condition, and each gate associated with the even-numbered bi-stable devices, when open, being arranged if the associated bi-stable device is in an "on" condition, to set the next even-numbered bi-stable device to that condition and to re-set the preceding even-numbered bi-stable device to the "off" condition.

2. A control register as claimed in claim 1, including means arranged to apply a signal to a selected gate so as to prevent that gate from passing a signal to operate the next bi-stable device.

3. A control register as claimed in claim 1, in which at least two gates are associated with one bi-stable device and selector means are provided for selecting one of those gates, the said gates being connected to provide different sequential orders of operation of the bi-stable devices.

4. A control register comprising a number of bi-stable devices arranged in sequential order, each bi-stable device being capable of being set in a selected one of "off" and "on" conditions, gates associated respectively with the bi-stable devices, first and second gate-controlling means controlling respectively the gates associated with alternate bi-stable devices in the sequential order, the first gate-controlling means being associated with the odd numbered bi-stable devices in the sequence and the second gate-controlling means being associated with the even numbered bi-stable devices in the sequence, the two gate-controlling means each periodically opening its associated gates for short periods with the two gate-controlling means operating alternately, each gate associated with the odd-numbered bi-stable devices, when open, being operative if the associated bi-stable device is in an "on" condition, to set the next odd-numbered bi-stable device in the sequence to that condition and to reset the preceding odd-numbered bi-stable device in the sequence to the "off" condition, and each gate associated with the even-numbered bi-stable devices, when open, being operative if the associated bi-stable device is in an "on" condition, to set the next even-numbered bi-stable device in the sequence to that condition and to re-set the next preceding even-numbered bi-stable device in the sequence to the "off" condition.

References Cited in the file of this patent

UNITED STATES PATENTS

| | | |
|---|---|---|
| 2,665,845 | Trent | Jan. 12, 1954 |
| 2,842,682 | Clapper | July 8, 1958 |
| 2,846,594 | Pankratz et al. | Aug. 5, 1958 |
| 2,933,620 | Huang | Apr. 19, 1960 |
| 2,947,944 | Turvey | Aug. 2, 1960 |

OTHER REFERENCES

Gott Publication "High Speed Counter Uses Surface Barrier Transistors Electronics," March 1956, pages 174–178.